United States Patent
O'Connor et al.

[11] Patent Number: 6,123,389
[45] Date of Patent: Sep. 26, 2000

[54] HEADREST

[76] Inventors: Richard W. O'Connor, 860 Lavender Dr., Sunnyvale, Calif. 94086; Brian H. Steuer, 1090 Cloud Ave., Menlo Park, Calif. 94025

[21] Appl. No.: 09/374,077

[22] Filed: Aug. 12, 1999

Related U.S. Application Data

[60] Provisional application No. 60/096,426, Aug. 13, 1998.

[51] Int. Cl.⁷ .................................................... A47C 1/10
[52] U.S. Cl. ............................ 297/397; 297/399; 5/636; 5/640
[58] Field of Search ................................. 297/397, 399, 297/391; 5/636, 640, 643

[56] References Cited

U.S. PATENT DOCUMENTS

| | | | |
|---|---|---|---|
| 2,464,435 | 3/1949 | Conradt | 297/397 |
| 2,582,571 | 1/1952 | Thoma | 297/397 |
| 2,587,196 | 2/1952 | Morecroft | 297/397 X |
| 2,613,731 | 10/1952 | Roginski | 297/399 |
| 2,827,110 | 3/1958 | Rising | 297/399 |
| 2,983,310 | 5/1961 | Warlick et al. | 297/399 |
| 3,283,344 | 11/1966 | Blanchard | 5/636 X |
| 3,537,750 | 11/1970 | Lohr | 297/397 X |
| 4,030,781 | 6/1977 | Howard | 297/397 |
| 4,031,578 | 6/1977 | Sweeney et al. | 5/636 X |
| 4,440,443 | 4/1984 | Nordskog | 297/397 |
| 5,074,574 | 12/1991 | Carwin | 297/397 X |
| 5,135,283 | 8/1992 | Cassese et al. | 297/397 |
| 5,345,633 | 9/1994 | Harnish | 297/397 X |
| 5,467,782 | 11/1995 | Wiseman | 5/636 |
| 5,505,523 | 4/1996 | Wang | 297/397 X |
| 5,544,378 | 8/1996 | Chow | 5/640 X |
| 5,669,665 | 9/1997 | Nowak | 297/397 X |
| 5,800,019 | 9/1998 | Knightlinger | 297/397 X |
| 5,918,933 | 7/1999 | Hutchinson et al. | 297/397 X |

*Primary Examiner*—Peter M. Cuomo
*Assistant Examiner*—Rodney B. White
*Attorney, Agent, or Firm*—Marsh Fischmann & Brey Fogle LLP

[57] ABSTRACT

A headrest for supportably engaging a person's head at rest to substantially inhibit neck strain is disclosed. In one embodiment, the headrest includes a frame member for supporting the back portion and first and second side portions of a person's head, and a padding member covering at least a portion of the frame member. Such frame member may include a back member extending between first and second wing members, such wing members being pivotal relative to the back member to provide adjustability in the width of the headrest.

27 Claims, 6 Drawing Sheets

HEADREST

RELATED APPLICATION

This application claims the benefit of U.S. Provisional Application Ser. No. 60/096,426, filed Aug. 13, 1998.

FIELD OF THE INVENTION

The present invention generally relates to headrests, and in particular, headrests for use in connection with seats, such as car seats and airplane seats.

BACKGROUND OF THE INVENTION

Generally, a passenger in a passenger vehicle, such as an automobile, airplane, bus or train, suffers significant neck strain when resting since seats in such passenger vehicles typically provide support only to the back portion of the passenger's head. More specifically, since seats in such passenger vehicles are not designed to keep the passenger's head in a substantially upright, vertical orientation relative to the passenger's torso (e.g., when the passenger is at rest or sleeping), neck strain may result due to the natural instability of an unsupported head when no muscles are being used to support the head.

In order to alleviate such neck strain, various devices have been developed. For instance, pillows designed to fit around the backside of the passenger's neck have been developed. Such neck pillows are inflatable with air or consist solely of a foam material. However, such neck pillows generally do not provide adequate support to inhibit neck strain due to their readily deformable or "sponge-like" nature. Further, use of such neck pillows tends to allow the entire body of the user to slide sideward because lateral acceleration causes the passenger's body to slip against the seat. In addition, such neck pillows typically do not allow passengers to adjust the configuration of the device to suit the passenger's tastes or dimensions.

SUMMARY OF THE INVENTION

Accordingly, it is an object of the present invention to provide a headrest which alleviates neck strain.

It is a further object of the present invention to provide a headrest capable of supporting at least a side portion and/or a back portion of a person's head.

It is another object of the present invention to provide a headrest which is releasably securable to chairs or passenger seats in various vehicles, such as automobiles, buses, trains and airplanes.

It is another object of the present invention to provide a headrest which is portable and easily storable.

It is still another object of the present invention to provide a headrest which is adjustable to suit a passenger's tastes or dimensions.

It is yet another object of the present invention to provide a headrest which is interconnectable to a back support portion of a passenger seat and which replaces existing headrests.

In one aspect, the present invention is embodied in a headrest for use in various land-based and air-based vehicles, such as automobiles, buses, trains and airplanes. Generally, the headrest of the present invention may include a frame comprising a back member for supportably engaging at least a back portion of a person's (e.g., passenger's) head and first and second wing members for supportably engaging first and second side portions, respectively, of the person's head, and a first interconnecting member for attaching at least the back member to a seat. The first and second wing members function to inhibit neck strain by supporting first and second side portions of the passenger's head (e.g., cheekbone portions), respectively, when the passenger falls asleep (depending upon to which side the passenger's head is leaning). In one embodiment, the first and second wing members are integrally formed with first and second end portions of the back member as a unitary structure. In another embodiment, the first and second wing members are pivotally interconnected to first and second end portions of the back member, respectively. In both of these embodiments, the first and second wing members, in cooperation with the back member, provide a rigid structure or frame to support a person's head when such person's head falls to one side or the other when such person falls asleep. In addition, such headrest may be utilized in various configurations due to the adjustability of the first and second wing members. By virtue of this arrangement, virtually uninterrupted sleep may be achieved without substantial neck strain since the headrest of the present invention can supportably engage either or both sides of a person's head with the wing members. In an alternative embodiment, the headrest of the present invention includes only a single wing member interconnectable to the back member.

More specifically, in one embodiment, the headrest includes a substantially C-shaped or U-shaped frame and an interconnecting member for attaching the frame to a seat, such as a passenger seat utilized in automobiles, airplanes, buses and trains or an office-type of chair. In this embodiment, the rigid frame includes a back member for supportably engaging at least a back portion of a person's head and first and second wing members integrally formed with the back member at first and second end portions of the back member. Such wing members are capable of supportably engaging first and second side portions of the person's head. The frame may comprise a rigid or semi-rigid material having a modulus of elasticity (e.g., at least about $10^6$ psi) and/or a yield strength of between about 3,000 psi and about 30,000 psi. In this regard, the first and second wing members may be bent relative to the back member, such that the size of the cavity defined by the first and second wing members and back member is variable. As such, due to the adjustability of the first and second wing members relative to the back member, various head sizes and configurations of the head support may be achieved while providing support to either side of an unsupported head at rest. The wing members are generally 6–7 inches in length from the back member to the tips of the wing members. The headrest of the present invention may also be used as a support device in other applications (e.g., lumbar area in automobile seats, the thoracic/rib cage area or the leg or seat area of automobile seats, or alternatively, hospital beds, Rotorest® or any lateral motion therapy bed). Such a support may be utilized in other seats, such as dental chairs to locate or position a patient's head in a fixed position, massage tables, chiropractic chairs and tables, and physical therapy tables (e.g., to strengthen the patient's neck if injured and in need of physical therapy by applying torque to the wing members). Other uses of the support include recliner chairs, chaise lounge chairs and infant or children's seats (e.g., car seats).

In another embodiment, width adjustability of the headrest is provided by first and second hinge members, which hingedly interconnect the first and second wing members, respectively, to first and second end portions of the back member, respectively. In order to provide such adjustability, such that the first and second wing members are capable of supporting first and second side portions of a person's head, the first and second hinges may include a pivot adjustment mechanism for releasably maintaining the first and second wing members, independently, at any of a plurality of pivot positions relative to the back member. In this regard, the first and second wing members may be moved to desired configurations/positions relative to the back member and releasably fixed in such configurations/positions to support first and second side portions of a person's head when resting. Such adjustment not only provides comfort to the user, but also may facilitate easy storage of the headrest by providing a foldable headrest (e.g., a headrest capable of lying flat), which occupies less space than other conventional headrests. In one embodiment, the hinge members comprise unbalanced hinges requiring less torque to move the first and second wing members inwardly, than to move the first and second wing members outwardly, towards an unfolded, open configuration. Such hinges (e.g., clutch spring hinge) also function to dampen the loads to provide a more comfortable ride to the user. In an alternative embodiment, adjustability of the wing members is provided by motorizing the wing members by placing a geared motor(s) proximate the hinges interconnecting the wing members to the back member. Such geared or coupled motor(s) enables the user to easily adjust the angle of each wing member relative to the back member. In yet another embodiment, the hinges are adapted to allow the wing members to not only move inwardly and outwardly relative to the back member, but also upwardly and downwardly (i.e., vertically) relative to the back member, to thereby allow the wing members to be stowed along the ends (i.e., sides) of the back member. In this embodiment, such hinges may further include a pin joint or may otherwise comprise a ball joint. Alternatively, the hinges may be adapted to allow the wing members to move only upwardly and downwardly relative to the back member, the wing members being oriented in fixed relation relative to the back member at about 20 degrees to allow a person's head to rest against one or both wing members. For purposes of providing a light-weight yet durable headrest, the first and second wing members and/or the back member may comprise a light-weight metal, such as aluminum, wood, composites, or a plastic, such as high density polyethylene (HDPE).

The headrest of the present invention may be interconnected to a passenger seat of a vehicle in various fashions, depending upon whether the headrest of the present invention is to replace a removable headrest interconnected to a back seat portion of a passenger seat, or is to be utilized as a kit-type of add-on to an existing headrest of a passenger seat. In one embodiment, in instances where the headrest of the present invention will replace a conventional removable headrest, the interconnecting member for attaching the headrest to the back seat portion of the passenger seat comprises at least a first post or stem (e.g., blade) which is interconnected or integrally formed with the back member of the headrest. Such post or stem may be configured to be received within an existing post-receiving channel which extends vertically through at least a portion of the back seat portion of the passenger seat. Such posts or stems are particularly useful when combined with the headrest of the present invention to provide lateral support to users when subjected to torque loading. In instances where the headrest will be attached to an existing, conventional headrest of a passenger seat, the interconnecting member may comprise a first strap adapted to extend around the perimeter of the conventional headrest. Such strap may be of a non-slip nature (e.g., non-slip suede, vinyl, or other similar high coefficient of friction material) and include at least a first fastening mechanism, such as Velcro, buckles, clamps, cinches, etc. for securing the strap about the conventional headrest of the passenger seat. Such non-slip material inhibits migration of the headrest relative to the seat.

For purposes of providing comfort to the passenger, the headrest of the present invention may further include padding and a cover. In one embodiment, where the frame comprises a unitary, integrally formed structure, the padding may include a molded foam member which is receivable over the frame, such that the frame is not exposed or otherwise contactable with the passenger's head. In order to provide sufficient comfort while supporting a person's head, in one embodiment, the padding has 25% impact load deflection (ILD) of between about 1.0 to about 3.5 and, in a preferred embodiment, between about 1.6 to about 2.5. In one embodiment, the 25% ILD of the padding is about 2.3. In one embodiment, the padding comprises a gel or foam material, such as a Tempurepedic® foam (e.g., a heat sensitive, highly conformable polyurethane). In another embodiment, the padding may comprise first and second layers, whereby the first layer of padding has a durometer greater than the second layer of padding, the first layer of padding in abutting relation with the frame. In addition, in order to enhance adherence of the padding to the frame, the frame may include a plurality of hollowed or cut out areas while reducing the potential for delamination and damage to the headrest. Alternatively, the padding may comprise separate foam members each covering a specific portion of the frame. For example, first and second wing foam members may cover the first and second wing members, respectively, while a back foam member covers the back member. The padding may also include a neck roll for abuttingly engaging a back portion of a user's head (e.g., protrusion on lower, back area of person's head, about the neck area). Such neck roll functions to position or align the user's head with the wing members and further to be the primary loading point on the back of the user's head. The neck roll enhances positioning of the wing members relative to the user's eyes, such that the user can see over the wing members due to neck roll functioning as the primary locator point. In other embodiments, the padding of at least the wing member is a sound absorbing foam adapted to inhibit noise penetration (e.g., when the wing members are positioned over the user's ear(s)). In another embodiment, the first and second wing members include first and second sound speakers, respectively, which are in electrical communication (e.g., via a standard jack phone system) with a portable stereo or other similar device (e.g., automobile stereo, airplane sound system, etc.). Alternatively, such stereo system may be battery-powered and incorporated into the headrest. In still another embodiment, the first and second wing members may include commercially available noise cancellation circuitry that is adapted to cancel ambient noise by generating 180° phase shifted frequencies to those ambient, thereby canceling the noise at the user's ear(s). In yet another embodiment, the wing members may include a sound system adapted to generate repeating or constant frequencies that are soothing to listeners. Such sound system may be positioned in the wings or in the back member with controls (e.g., knobs) on the backside (e.g., non-head supporting) surface of the wings for easy control access during use. In still another embodiment, the headrest may include a pitch control mechanism, to provide further comfort to the user, such pitch control to allow the headrest to roll forward on a pawl that supports the headrest in a first, forward position until it is rolled fully forward at which point the pawl is released to allow the headrest to go back to an aft position.

DETAILED DESCRIPTION OF THE INVENTION

FIGS. 1–4B illustrate the various features and characteristics of the present invention. Generally, for purposes of supporting a person's head when such person falls asleep in a seated or prone position (e.g., when seated or lying down in a car seat, train seat, airplane seat, bus seat, etc. or a chair), the headrest of the present invention generally includes a rigid or semi-rigid frame having first and second wing members and a back member interposed therebetween, and at least a first padding member interposable between the person's head and at least one of the first and second wing members and back member. Due to the support provided by the rigid or semi-rigid frame, neck strain is substantially inhibited or otherwise reduced.

Figure 1:
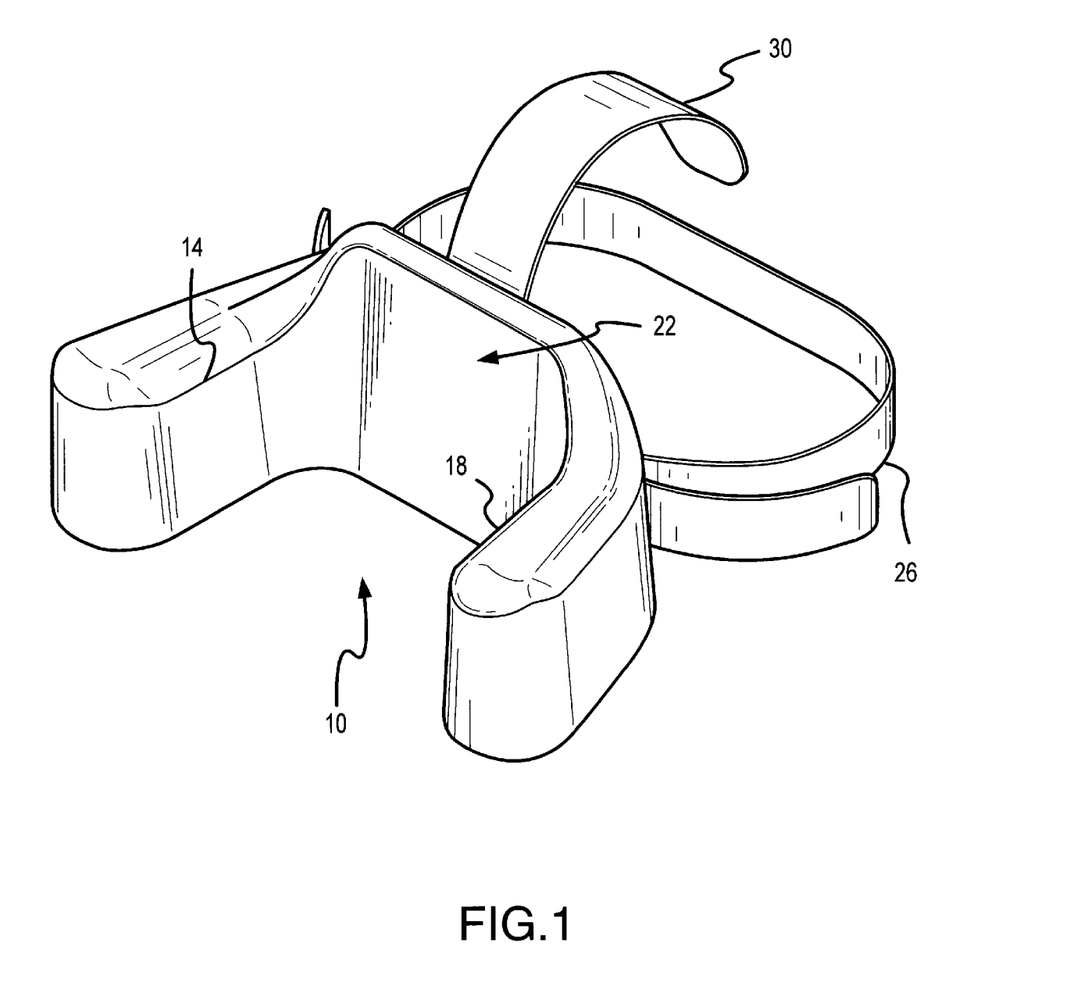
FIG. 1 is perspective view of one embodiment of the headrest of the present invent.
Figure 2:
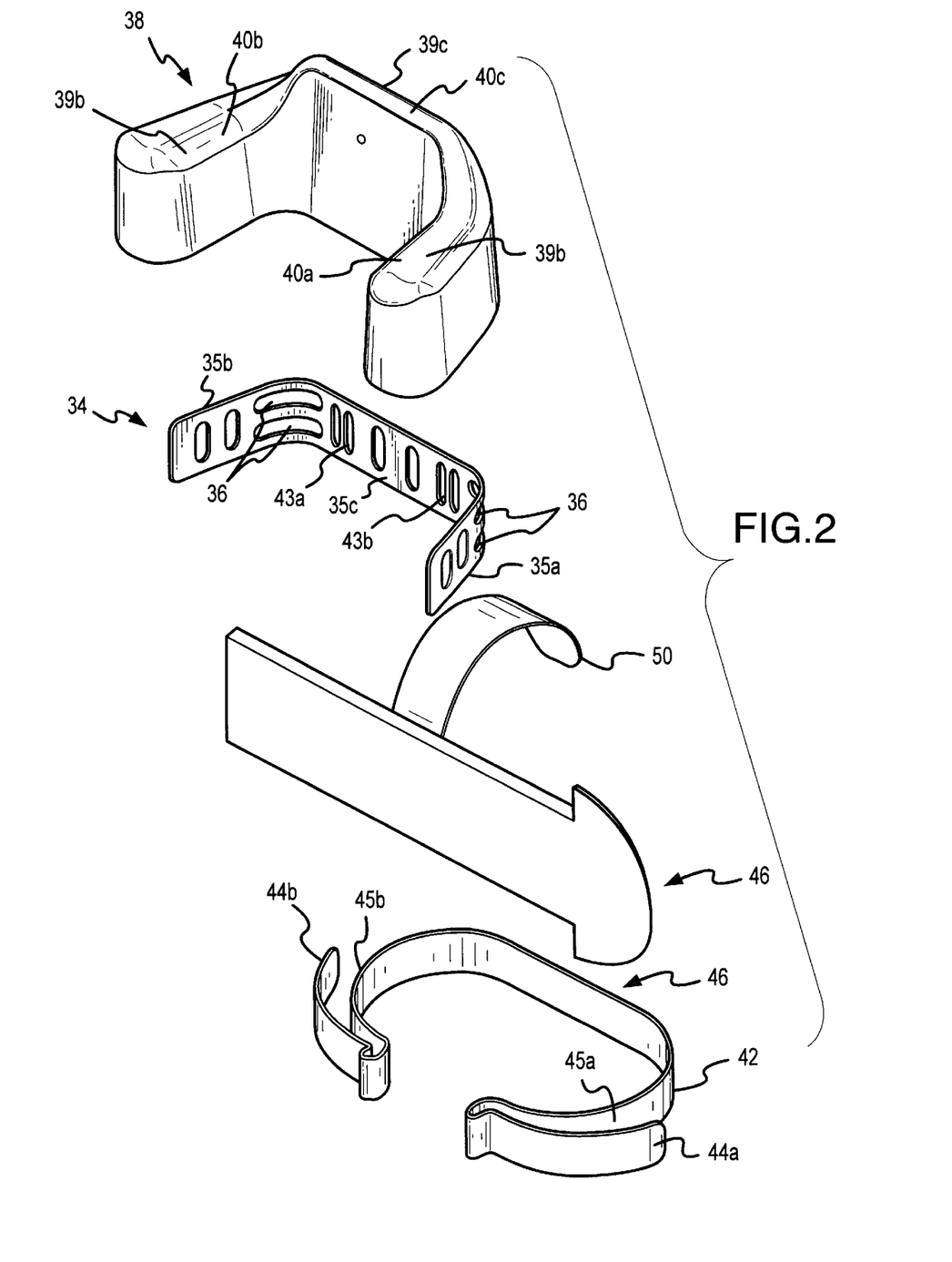
FIG. 2 is an exploded view of the headrest illustrated in FIG. 1.

Referring to FIGS. 1–2, in one embodiment of the headrest of the present invention, the headrest 10 generally includes first and second side or wing portions 14, 18 for supportably engaging side portions of a person's head, especially when the person is seated, a back portion 22 for supportably engaging a back portion of a person's head, especially when at rest, and an interconnecting member 26 for securing the headrest to a seat. For purposes of inhibiting slippage of the headrest 10 relative to a seat, in this embodiment, the headrest 10 further includes a pitch restraint member 30 which is adapted to engage (e.g., in a pressure fit manner) a top portion of the seat (e.g., an existing headrest portion of the seat).

More specifically, and referring to FIG. 2, the headrest 10 of this particular embodiment of the present invention includes a semi-rigid or rigid frame 34, a padding member 38 and a strap 42 for interconnecting the headrest to a seat. For purposes of adequately supporting a person's head, and in particular a person's head when the person is asleep and the head is tilted to one side or the other, the frame member 34 is generally C-shaped or U-shaped, and includes first and second wing members 35a, 35b for supporting a person's head (e.g., side portions of the person's unsupported head) and a back member 35c, which is adapted to provide the interface between the first and second wing members 35a, 35b and the seat, via the strap 42, which is feedable through the vertical slots 43a, 43b of the back member 35c (which will be described in more detail hereinbelow). In this embodiment, the first and second wing members 35a, 35b are integrally formed with the back member 35c. In addition, in order to provide adjustability in the size of the cavity formed by the headrest 10 (e.g., width adjustability), the first and second wing members 35a, 35b are pivotable relative to the back member 35c. In this regard, the frame 34 may comprise a bendable material, such as aluminum, aluminum alloys, plastic, composite or steel. The frame 34 is sufficiently stiff to support lateral loads of up to 8 pounds (i.e., 40 in.-lbs.) at the tips of the wing members 35a, 35b and to support the weight of the wings. In this regard, the headrest may fold to a flattened configuration if 45 in.-lbs. or more were applied to the wing members. Such a headrest provides safety features as it would buckle under light impact loads to the tips of the wing members (i.e., column strength is weak) and 45 in.-lbs. under lateral loads. Such frame may be fabricated from a thermoplastic elastomer, such as Hytrel. Alternatively, the frame may be fabricated from a shape memory alloy, such as nickel titanium, which could provide for some adjustability of the wing members relative to the back member. As such, the frame member 34, and specifically, the first and second wing members 35a, 35b are capable of being bent relative to the back member 35c, in a hinge fashion, and are capable of substantially maintaining such orientation relative to the back member to suitably support a head at rest thereon. Such width adjustability is enhanced by providing at least one cut out or slotted area 36 in each hinge area of the frame member 34. Advantageously, the first and second wing members 35a, 35b are independently movable relative to each other and the back member 35c, which enables a user to move the wing members to any of a number of desired positions relative to each other and to the back member 35c. It should be noted that such cut out areas 36 also function to ensure that the padding member 38 is anchored to the frame member 34 as portions of the padding member 38 proximate such cut out areas 36 fill such cut out areas 36.

The strap 42 generally functions to interconnect the frame member 34 to a seat or chair. In this embodiment, and referring to FIGS. 1 and 2, the strap 42 is receivable within the slots 43a, 43b of the back member 35c, and comprises a hook and loop fastener (e.g., Velcro) to secure end portions 44a, 44b of the strap 42 to intermediate portions 45a, 45b of the strap 42, respectively, whereby a middle portion 46 of the strap is loopable around a back portion of a seat. Use of such a strap 42 allows for a quick and efficient installation onto a seat without endangering passengers positioned in back of the seat. Alternatively, the strap may include one or more buckles, cinches, clamps and other similar fastening devices for attaching the headrest 10 onto a seat. Such strap 42 enables the headrest 10 of the present invention to be secured to substantially any type of in-place existing headrest of a seat, such as automobile seats, airplane seats, train seats, bus seats, office chairs and other similar types of seat structures.

As noted hereinabove, the headrest 10 also includes a padding member 38. In one embodiment, the padding member is a molded foam headrest. The frame member 34 may be molded into the padding member 38. Generally, the inner surfaces of the first and second wing portions 39a, 39b of the padding member 38 are fully radiused so that side portions of an unsupported head of a person can contact the headrest at virtually any angle, from horizontal to vertical, in a comfortable manner. The back portion 39c of the padding member 38 transitions to the wing portions 39a, 39b in a relatively large radius, upon which an unsupported rear portion of a head may be supported. Further, in this embodiment, for purposes of adequately supporting a person's unsupported head, the padding member 38 has a 25% ILD between about 1.6 and about 2.6, and more particularly, between about 1.8 and about 2.4. In a preferred embodiment, the 25% ILD of the padding is about 2.1. Alternatively, in order to enhance comfort, a first layer in contact with the frame member 34 may comprise a stiff, light weight foam while a second layer interposable between the head of a person and the first layer may have a softer, lower durometer to provide a softer, more cushioned support. Finally, the padding member 38 is configured to adequately support the back portion of a person's head while supportably engaging cheek bone portions of a person's head. More specifically, the padding member 38 is configured such that the top surface 40*c* of the back portion of the padding member is higher than the top surfaces 40*a*, 40*b* of the wing portions 39*a*, 39*b*.

Optionally, and as illustrated in FIG. 2, the headrest 10 may further comprise a cover 46 for enhancing comfort and for facilitating cleaning of the headrest 10. In one embodiment, the cover comprises leather, lycra, cotton, vinyl, Polartec® or other similar materials. The cover is removable and should be washable for hygiene purposes. In addition, the cover should be configured to snugly fit about the padding member 38 and may additionally include slots on the back side thereof to accommodate the strap 42. The headrest 10 may further include a pitch restraint member 50 interconnectable to the cover or frame. The pitch restraint member 50 is a vertical strap interconnectable to the top part of the back member 22, the strap 52 being loopable over the top of the headrest 10 and releaseably attachable to the cover 46 via a fastener (e.g., Velcro, snap, buckle, etc.). The pitch restraint strap 50 provides a three point mount to secure the headrest 10 to a seat headrest, which inhibits rolling down of the headrest 10 when a user leans against one of the wing members 35*a*, 35*b*.

In another embodiment, illustrated in FIGS. 3A–5, the headrest is adapted as a replacement for existing removable headrests on automobile-type seats. Generally, the headrest 110 illustrated in FIG. 5 includes first and second side portions 114, 118, a back member 122 and an interconnecting member 142 for securing the headrest to an existing seat. More specifically, and referring to FIGS. 3A–3B, the headrest includes a semi-rigid or rigid frame 134 comprising first and second wing members 135*a*, 135*b* which are pivotally interconnectable to a back member 135*c* via hinge members 136*a*, 136*b*, and first and second wing pad members 139*a*, 139*b* for covering first and second wing members 135*a*, 135*b*, along with a back pad member 139*c* for covering the back member 135*c*. Also included is an additional neck roll pad 139*d* on the back pad member 139*c* for abuttingly engaging a or lower area of the back side of a person's head. In this embodiment, the first and second wing members 135*a*, 135*b* and the back member 135*c* function to provide a rigid support structure for supporting an unsupported head of a person at rest or seated, substantially as described hereinabove with respect to the embodiment illustrated in FIGS. 1–2. In this regard, the first and second wing members and back member 135*a*, 135*b*, 135*c* may comprise a rigid material, such as aluminum, plastic, steel or other composite. The wing members 135*a*, 135*b* are generally rectangular in shape, and have a height less than that of the back member 135*c*. In addition, for purposes of reducing viewing interference when a user wishes to look sideways, such that the user can rest while looking over the wing members, the neck roll pad 139*d* is positionable between the upper and lower walls of the wing members 135*a*, 135*b*. Advantageously, the width of the back member 135*c* is about 6.5 inches, plus or minus 0.5 inch, such that the head of the user will be comfortably received within the cavity of the headrest without having to adjust the wing members 135*a*, 135*b* inwardly to such a degree (e.g., 80 degrees or more relative to the back member) that the wing members become a safety concern, especially in instances of acceleration or deceleration where the head may be forced back toward the headrest. Of importance, in this embodiment, the hinge members 136*a*, 136*b* function to allow pivotal or hinged movement of the wing members 135*a*, 135*b* relative to the back member 135*c*. Such pivotal movement of the first wing member 135*a* is independent of the pivotal movement of the second wing member 135*b* to provide numerous comfort configurations for the user. Such hinge members 136*a*, 136*b* also allow the headrest 110 to be used or otherwise stowed in a flattened configuration (e.g., 180 degrees relative to each member, or otherwise folded to provide a compact, easily storable headrest). Although the degree of rotation of the first and/or second wings may be varied relative to the front surface of the back member 135*c*, for safety reasons, rotation of the first and second wing members 135*a*, 135*b*, in a preferred embodiment, is limited to less than about 250 degrees relative to a front surface of the back member 135*c*.

Figure 6A:
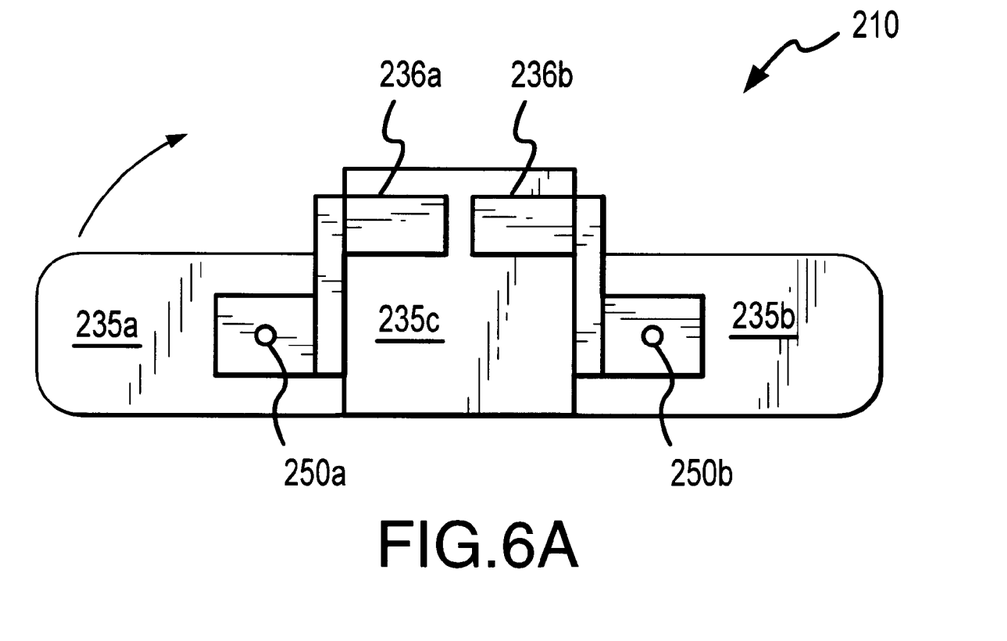
FIGS. 6A–6B illustrate another embodiment of the headrest of the present invention, showing the wing members being vertically rotatable relative to the back member.
Figure 6B:
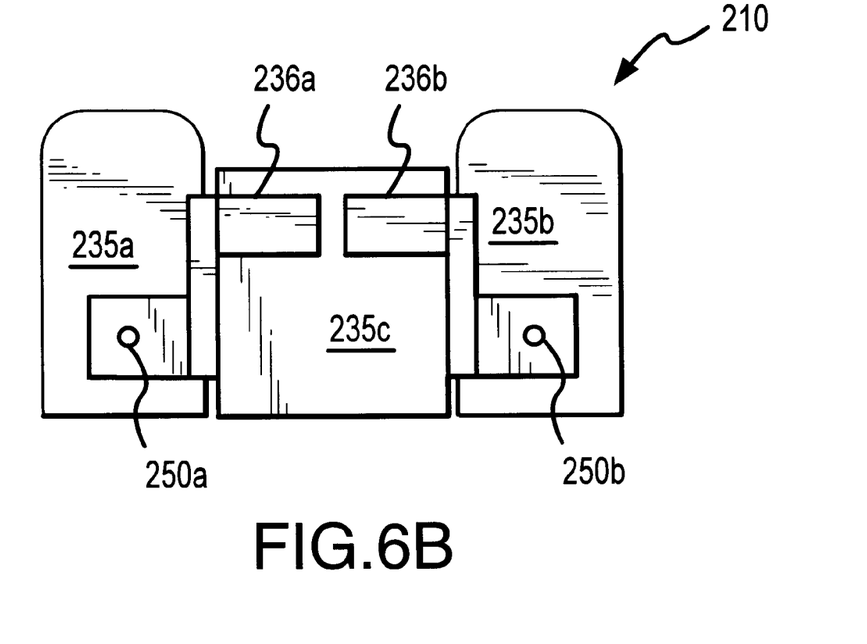

In another embodiment, illustrated in FIGS. 6A–6B, for purposes of facilitating stowage of the headrest 210, the wing members 235*a*, 235*b* of the headrest 210 are vertically rotatable relative to the back member 235*c* by providing to the first and second hinges 236*a*, 236*b*, respectively, swivel or ball joints 250*a*, 250*b*, respectively.

Figure 3A:
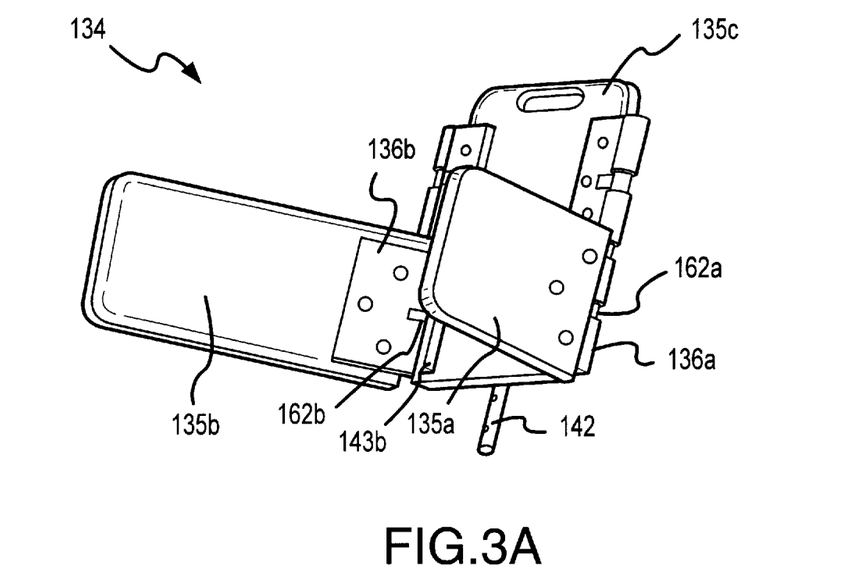
FIG. 3A–3B are perspective views of another embodiment of the frame of the headrest of the present invention.
Figure 3B:
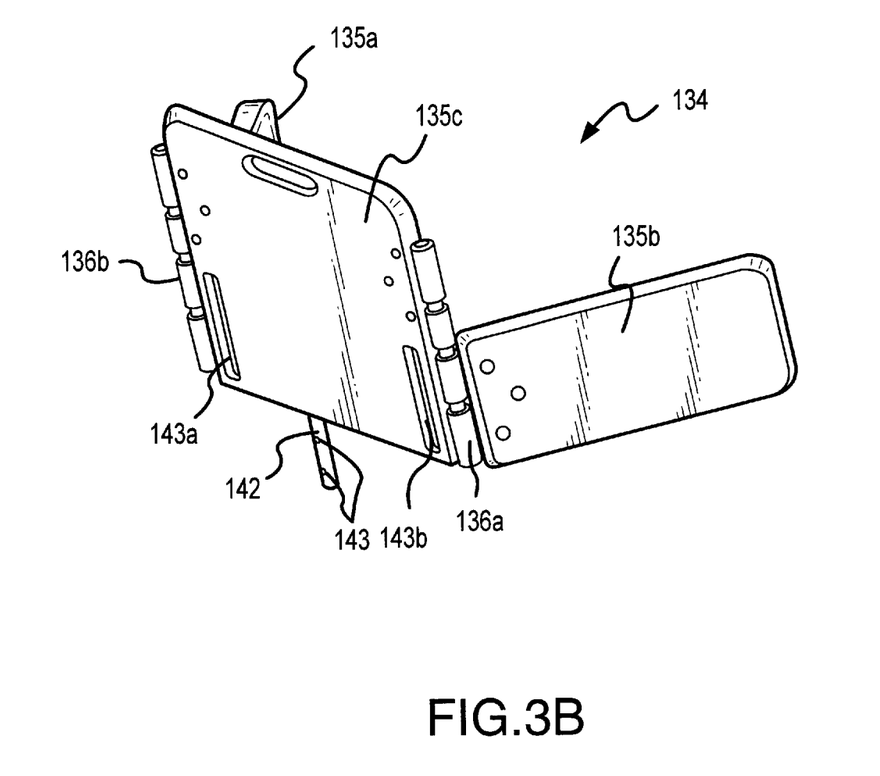

In one embodiment, the first and second hinge mechanisms 136*a*, 136*b* comprise unbalanced hinges (e.g., springs with definable friction consistent over a range of motion, such as clutch springs, torsion springs, etc.), whereby a first torque is required to rotate the first and second wing members 135*a*, 135*b* inwardly, towards the front surface of the back 135*c*, and a second torque different than the first torque is required to rotate the first and/or second wing member 135*a*, 135*b* outwardly, away from the front surface of the back member 135*c*. The first torque may be less than the second torque. For instance, the first torque required to rotate the first and/or second wing members 135*a*, 135*b* inwardly is about 25 inch pounds while the second torque required to rotate the first and/or second wing members 135*a*, 135*b* outwardly, relative to the back member 135*c* is about 35 inch pounds. In this regard, the hinge mechanisms 136*a*, 136*b*, in cooperation with the first and second wing members 135*a*, 135*b* and the back member 135*c* can support an unsupported head of a person while maintaining their respective position and/or orientation relative to each other. In another embodiment, the hinges may comprise a hinge mechanism which is adapted to allow the first and/or second wing member to be rotated inwardly and/or outwardly relative to the front surface of the back member 135*c*, such that the first and/or second wing members 135*a*, 135*b* are substantially parallel to the back member 135*c* to facilitate storage of the headrest. In this embodiment, the hinge mechanisms 136*a*, 136*b* define hinge axes which are coplanar and parallel to each other. In another embodiment (not shown), the hinge axes may be coplanar and not parallel to potentially provide enhanced comfort to a user. In addition, the first and second hinge mechanisms may be balanced hinges. Further, in still another embodiment, the hinge mechanism may comprise an adjustable coil mechanism.

For safety purposes, the wing members can be limited in their degree of motions. In this regard, the headrest 110 further includes first and second wing rotation stops 162*a*, 162*b* which function to ensure that the wing members 135*a*, 135*b* do not close (i.e., rotate inwardly). The wing rotation stops 162*a*, 162*b* thus prevent the wing members 135*a*, 135*b* from rotating beyond a selected orientation relative the back member 135*c*, which is especially useful in instances (e.g., accidents) during sudden braking or deceleration where the user may be thrown back against the headrest 110. As such, the wing rotation stops 162a, 162b limit the wing members 135a, 135b from rotating inwardly or forwardly relative to the back member 135a beyond a selected angle (e.g., 70 degrees). In one embodiment, the wing rotation stops 162a, 162b include a bar comprising metal or other high strength material mountable to the end portion of the back member, the bar adapted to bear upon the wing members when the wing members 135a, 135b rotate inwardly. Alternatively, the wing rotation stops 162a, 162b comprise a roll pin or dowel mounted on each of the spindles of the tension spring plates (i.e., hinges) varying the position of the wing members 135a, 135b relative to the end portions of the back member (e.g., extending the distance between the wing member mounting holes and the back member), or by mounting a bar or a rod between the two plates of each hinge, such bar being mounted along the axes of the hinge spindles but offset the diameter of the spindles and material to enable it to swing until contacting the hinge plate of the other section. In still another alternative embodiment, high durometer foam wedges are positionable on the front faces of the wing members. Such wedges may be bonded or glued to the wing members, and would allow the wing members to rotate no more than 70 degrees forward (e.g., from a flat configuration) with 45 degrees of the 70 degrees being limited by the wing frame and the remaining 25 degrees by the wedge for each wing member. The headrest may alternatively include an automatic wing retraction system (e.g., if wings are motorized) which would function to retract the wings to a flat configuration (e.g., substantially planar with back members) when sudden acceleration or deceleration is sensed. In this regard, the wing retraction system may include a "g" sensor or an airbag type of trigger sensor to initiate retraction of the wings.

Figure 4A:
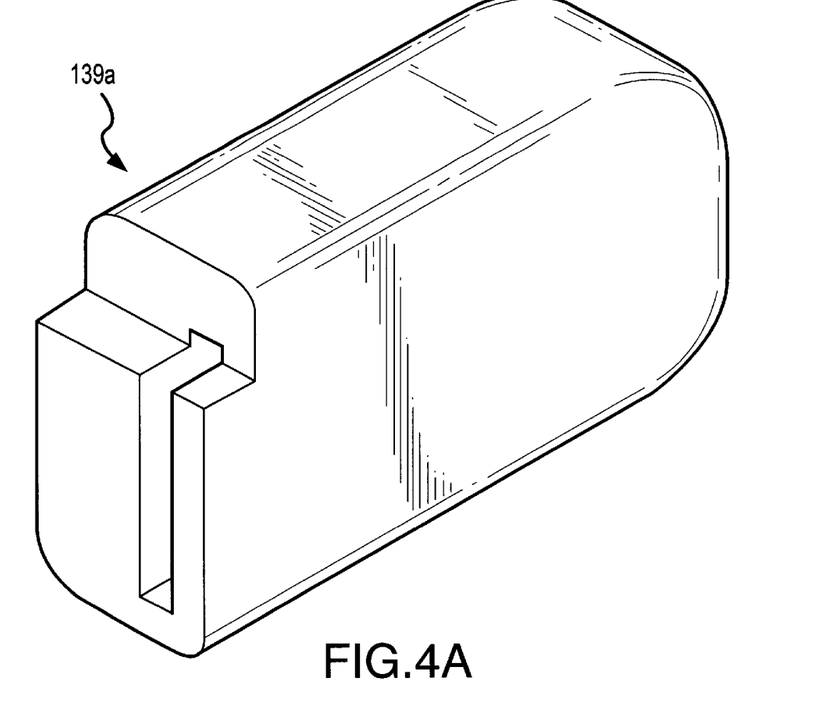
FIGS. 4A–4B are perspective views of the padding of the headrest of the present invention.
Figure 4B:
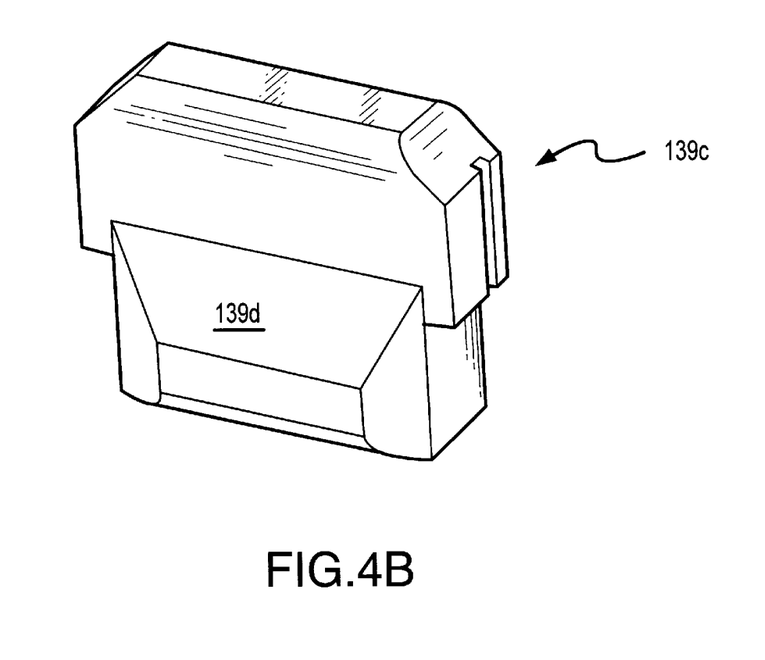
Figure 5:
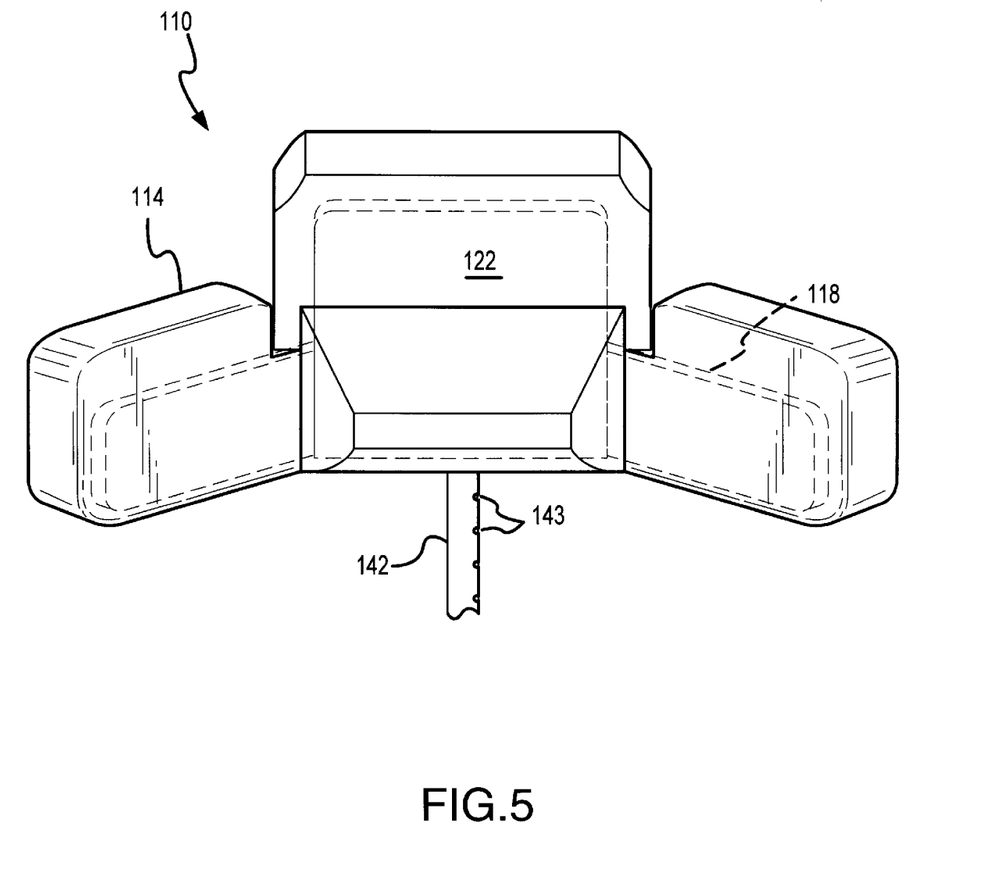
FIG. 5 is an embodiment of the headrest of the present invention.

In the embodiment illustrated in FIGS. 3–4, the interconnecting member comprises one or more stems or rods attached to the base of the back member 135c. In this regard, the headrest may replace existing removable headrests in automobile seats or other similar type seats. Such stems or rods 142 may comprise a metallic material such as steel, to adequately support a head during rear-end collisions (e.g., for automobile applications) and while the user is at rest. Such rods 142 may also include a plurality of notches to provide height adjustability of the back member relative to an automobile seat interconnected thereto, since such automobile seats typically include a channel or tube for receiving such rods 142 and a height adjustment mechanism operatively mounted with such notches 143. In an alternative embodiment, the headrest may instead include a strap for securing the headrest to a seat or headrest portion of an existing seat. Such a strap is positionable adjacent to the hinge axes defined by the first and second hinges 136a, 136b and may be looped through slots in the back member 136c, substantially as described hereinabove with respect to the embodiment of the headrest illustrated in FIGS. 1–2. In the illustrated embodiment, the back member 136c includes insert areas which allow the strap to be positioned close to the hinges, such that the mounting strap is located largely along or about the hinge axis. Such insert area enhances stability. The headrest may further include a releasable locking mechanism (e.g., a tab on the hinge) for locking the first and/or second wing members in at least one of various positional orientations relative to the back member 135c.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain the best modes known for practice in the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A headrest for supporting a person's head, said headrest comprising:
    at least a first wing member adapted to abuttingly engage at least a first side portion of the head;
    a back member adapted to abuttingly engage at least a back portion of the head; and
    at least a first hinge for interconnecting said first wing member to a first portion of said back member, wherein said first wing member is pivotable relative to said back member, wherein at least said first hinge includes a first pivot adjustment member for maintaining said first wing member in at least a first of a first plurality of pivot positions relative to said back member, said first pivot adjustment member comprising a first torsion spring.

2. A headrest, as claimed in claim 1, further comprising:
    an interconnecting member for releasably interconnecting said back member to a seat adapted to support the person.

3. A headrest, as claimed in claim 1, further comprising:
    at least a first stem interconnectable to said back member, said first stem adapted to releasably engage a seat adapted to support the person.

4. A headrest, as claimed in claim 3, wherein at least said first stem includes at least first and second vertical adjustment portions for releasably engaging a first vertical stop member of the seat, wherein said back member is vertically adjustable relative to the seat at least first and second vertical positions.

5. A headrest, as claimed in claim 1, further comprising:
    a first strap for interconnecting said back member to a head support portion of a seat adapted to support the person.

6. A headrest, as claimed in claim 1, further comprising:
    at least a first cushion member for covering at least one of said back member and said first wing member.

7. A headrest as claimed in claim 1, further comprising a second wing member interconnectable to said back member via a second hinge, wherein said second hinge includes a second pivot adjustment member, for releasably holding said second wing member in at least a first of a plurality of second pivot positions relative to said back member, wherein said first wing member is pivotable independent of said second wing member, said second pivot adjustment member comprising a second torsion spring.

8. A headrest as claimed in claim 1, wherein one of a front wall and a back wall of at least said first wing member is abuttingly engagable with one of the front wall and the back wall of said back member.

9. A headrest, as claimed in claim 1, wherein at least said first wing member is pivotable relative to said back member between first and second stop pivot positions, wherein at said first stop pivot position a first surface of said first wing member is angled 70 degrees or less relative to said back member.

10. A headrest, as claimed in claim 1, further comprising a second wing member interconnectable to said back member via a second hinge member, wherein said first and second hinges define first and second hinge axes, respectively, said first hinge axis being noncoplanar with said second hinge axis.

11. A portable headrest releasably interconnectable to a seat, said portable headrest comprising:
- a back member for supportably engaging at least a back portion of a person's head;
- first and second wing members for supportably engaging first and second side portions, respectively, of the person's head, wherein said first and second wing members are one of pivotally interconnected and integrally formed to first and second end portions of said back member, respectively; and
- a first interconnecting member for attaching said back member to the seat, wherein said first interconnecting member comprises a first stem releasably securable to a back support member of the seat.

12. A portable headrest, as claimed in claim 11, further comprising:
- first and second hinge members for pivotally interconnecting said first and second wing members, respectively, to said back member.

13. A portable headrest, as claimed in claim 12, wherein at least said first hinge member comprises a first unbalanced hinge requiring first and second torques to move said first wing member in first and second directions, respectively, relative to said back member.

14. A portable headrest, as claimed in claim 13, wherein said first torque for moving said first wing member in said first direction is greater than said second torque for moving said first wing member in said second direction.

15. A portable headrest, as claimed in claim 14, wherein said first and second directions correspond to at least said first wing member being in unfolded and folded configurations, respectively.

16. A portable headrest, as claimed in claim 11, further comprising:
- a retraction system for retracting said first and second wing members, said retraction system comprising at least a first sensor adapted to sense at least one of acceleration and deceleration.

17. A portable headrest, as claimed in claim 11, wherein said first and second wing members are each movable to at least one of first and second orientations, said first orientation corresponding to the first and second wing members being substantially coplanar with said back member, said second orientation corresponding to said first wing member being in abutting relation to said back member and said second wing member being in abutting relation to said first wing member.

18. A headrest comprising:
- a frame adapted to support a back portion and at least one of first and second side portions of a person's head, said frame comprising first and second wing members and a back member having first and second laterally spaced side walls;
- first and second pivot members for pivotally interconnecting said first and second wing members to said back member, respectively, said first and second pivot members located on said first and second side walls of said back member, said first and second pivot members including first and second torsion springs, respectively, for maintaining said first and second wing members in at a first of a first plurality of pivot positions and a first of a second plurality of pivot positions, respectively, relative to said back member;
- first and second rotation stop members for limiting rotation of said first and second wing members, respectively, relative to said back member, wherein said first and second wing members are each at least horizontally rotatable relative to said back member from a first position substantially coplanar with said back member to a second position, said second position being less or equal to about 80 degrees from said first position; and
- padding covering said frame, said padding at least interposable between said frame and the back portion and first and second side portions of the person's head.

19. A headrest, as claimed in claim 18, wherein said first and second pivot members are adapted to allow said first and second wing members to be vertically rotatable relative to said back member.

20. A headrest, as claimed in claim 18, wherein said padding comprises a neck roll portion for abuttingly engaging the back portion of the person's head.

21. A headrest, as claimed in claim 20, wherein said padding covering said first and second wing members includes upper and lower walls defining first and second planes, wherein said neck roll is positionable between said first and second planes.

22. A headrest, as claimed in claim 18, wherein said headrest is integrally formed with a seat.

23. A headrest for supporting a person's head, said headrest comprising:
- at least a first wing member adapted to abuttingly engage at least a first side portion of the head;
- a back member adapted to abuttingly engage at least a back portion of the head;
- at least a first hinge for interconnecting said first wing member to a first end portion of said back member, wherein said first wing member is pivotable relative to said back member; and
- an interconnecting member for releasably interconnecting said back member to a seat adapted to support the person, wherein said interconnecting member includes at least a first stem interconnectable to said back member, said first stem adapted to releasably engage the seat.

24. A headrest for supporting a person's head, said headrest comprising:
- at least a first wing member adapted to abuttingly engage at least a first side portion of the head;
- a back member adapted to abuttingly engage at least a back portion of the head; and
- at least a first hinge for interconnecting said first wing member to a first and portion of said back member, wherein said first wing member is pivotable relative to said back member, said first hinge comprising a first unbalanced hinge, wherein a first torque for moving said first hinge in a first direction is greater than a second torque for moving said first hinge in a second direction.

25. A portable headrest releasably interconnectable to a seat, said portable headrest comprising:
- a back member for supportably engaging at least a back portion of a person's head;
- first and second wing members for supportably engaging first and second side portions, respectively, of the person's head, wherein said first and second wing members are one of pivotally interconnected and integrally formed to first and second end portions of said back member, respectively;

first and second hinge members for pivotally interconnecting said first and second wing members, respective, to said back member; and a first interconnecting member for attaching said back member to the seat, wherein said first interconnecting member comprises a first strap and a second strap, said first strap being loopable through first and second slots of said back member, said first and second slots being located proximate said first and second hinges, wherein said second strap is loopable through a third slot located in an upper portion of said back member.

26. A portable headrest releasably interconnectable to a seat, said portable headrest comprising:

a back member for supportably engaging at least a back portion of a person's head;

first and second wing members for supportably engaging first and second side portions, respectively, of a person's head, wherein said first and second wing members are one of pivotally interconnected and integrally formed to first and second end portions of said back member, respectively; and a first interconnecting member for attaching said back member to the seat, wherein said first interconnecting member comprises a first strap and a second strap, said first strap being loopable through first and second slots of said back member, said first and second slots being located proximate a first intermediate portion and a second intermediate, respectively, said first and second intermediate portions extending between a first end portion and a second end portion of said back member and said first and second wing members, respectively, wherein said second strap is loopable through a third slot located in an upper portion of said back member.

27. A portable headrest releasably interconnectable to a seat, said portable headrest comprising:

a back member for supportably engaging at least a back portion of a person's head;

first and second wing members for supportably engaging first and second side portions, respectively, of the person's head, wherein said first and second wing members are one of pivotally interconnected and integrally formed to first and second end portions of said back member, respectively;

a first interconnecting member for attaching said back member to the seat; and a retraction system for retracting said first and second wing members, said retraction system comprising at least a first sensor adapted to sense at least one of acceleration and deceleration.

* * * * *

(12) EX PARTE REEXAMINATION CERTIFICATE (6454th)
United States Patent
O'Connor et al.

(10) Number: US 6,123,389 C1
(45) Certificate Issued: Sep. 30, 2008

(54) HEADREST

(75) Inventors: Richard W. O'Connor, Sunnyvale, CA (US); Brian H. Steuer, Menlo Park, CA (US)

(73) Assignee: Dream Wings Corporation, Foster City, CA (US)

Reexamination Request:
No. 90/007,972, Feb. 17, 2006

Reexamination Certificate for:
Patent No.: 6,123,389
Issued: Sep. 26, 2000
Appl. No.: 09/374,077
Filed: Aug. 12, 1999

Related U.S. Application Data (60) Provisional application No. 60/096,426, filed on Aug. 13, 1998.

(51) Int. Cl.
*A47C 1/10* (2006.01)

(52) U.S. Cl. .................... 297/397; 297/399; 5/636; 5/640

(58) Field of Classification Search ............ 297/397, 297/399, 391; 5/636, 640, 643
See application file for complete search history.

(56) References Cited

U.S. PATENT DOCUMENTS

| | | | |
|---|---|---|---|
| 969,251 A | 9/1910 | Denzer | |
| 2,464,435 A | * 3/1949 | Conradt | 297/397 |
| 2,638,152 A | 5/1953 | Pulsifer | |
| 2,719,577 A | 10/1955 | Eyman | |
| 2,917,109 A | 12/1959 | Marsh | |
| 2,976,915 A | 3/1961 | Spound | |
| 3,466,091 A | 9/1969 | DeGrusso | |
| 4,031,578 A | 6/1977 | Sweeney et al. | |
| 4,042,791 A | 8/1977 | Wiseman | |
| 4,130,318 A | 12/1978 | Hemmen et al. | |
| 4,205,878 A | 6/1980 | Wooten | |
| 4,339,151 A | 7/1982 | Riggs | |
| 4,490,842 A | 12/1984 | Watanabe | |
| 4,619,483 A | 10/1986 | Dickey et al. | |
| 4,738,488 A | 4/1988 | Camelio | |
| 4,762,367 A | 8/1988 | Denton | |
| 4,776,049 A | 10/1988 | Perron | |
| 4,797,934 A | 1/1989 | Hufnagel | |
| 4,913,491 A | 4/1990 | Mizuno et al. | |
| 4,971,393 A | 11/1990 | Maisenhalder | |
| 4,991,222 A | 2/1991 | Nixdorf | |
| 5,108,150 A | 4/1992 | Stas et al. | |
| 5,154,186 A | 10/1992 | Laurin et al. | |
| 5,161,855 A | 11/1992 | Harmon | |
| 5,220,700 A | 6/1993 | Liu | |
| 5,370,446 A | 12/1994 | Bancod | |
| 5,411,468 A | 5/1995 | Chen et al. | |
| 5,443,303 A | 8/1995 | Bauer et al. | |
| 5,513,897 A | 5/1996 | Lemmen | |

(Continued)

FOREIGN PATENT DOCUMENTS

| | | |
|---|---|---|
| DE | 24 49 193 | 4/1976 |
| DE | 3039934 | 10/1980 |
| DE | 8810569 | 8/1988 |

(Continued)

OTHER PUBLICATIONS

"Quantas Launches a New Era for Business Class," Times Business Pubs, Business Times (Singapore), pp. 10,11, Nov. 22, 1994.

(Continued)

*Primary Examiner*—Matthew C. Graham (57) ABSTRACT

A headrest for supportably engaging a person's head at rest to substantially inhibit neck strain is disclosed. In one embodiment, the headrest includes a frame member for supporting the back portion and first and second side portions of a person's head, and a padding member covering at least a portion of the frame member. Such frame member may include a back member extending between first and second wing members, such wing members being pivotal relative to the back member to provide adjustability in the width of the headrest.

U.S. PATENT DOCUMENTS

| | | | |
|---|---|---|---|
| 5,531,505 | A | 7/1996 | Baetz et al. |
| 5,613,736 | A | 3/1997 | Schaked et al. |
| 5,669,668 | A | 9/1997 | Leuchtmann |
| 5,752,742 | A | 5/1998 | Kerner et al. |
| 5,806,933 | A | 9/1998 | Tsui et al. |
| 5,868,471 | A | 2/1999 | Graham et al. |
| 5,967,613 | A | 10/1999 | McKeever |
| 5,997,091 | A | 12/1999 | Rech et al. |
| 5,997,097 | A | 12/1999 | Engelhard |
| 6,120,099 | A | 9/2000 | Reikeras et al. |
| 6,123,389 | A | 9/2000 | O'Connor |
| 6,158,812 | A | 12/2000 | Bonke |
| 6,158,813 | A | 12/2000 | Karash |
| 6,224,158 | B1 | 5/2001 | Hann |
| 6,250,716 | B1 | 6/2001 | Clough |
| 6,305,749 | B1 | 10/2001 | O'Connor et al. |
| 6,435,617 | B1 | 8/2002 | McNair |
| 6,467,846 | B2 | 10/2002 | Clough |
| 6,513,871 | B2 | 2/2003 | Bartels |
| 6,594,839 | B1 | 7/2003 | Papay |
| 6,601,804 | B2 | 8/2003 | Bisch |
| 6,648,416 | B2 | 11/2003 | O'Connor et al. |
| 6,692,071 | B2 | 2/2004 | Fowler |
| 6,893,094 | B2 | 5/2005 | O'Connor |
| 2001/0040401 | A1 | 11/2001 | Lin |
| 2002/0067063 | A1 | 6/2002 | Taborro |
| 2003/0030309 | A1 | 2/2003 | Pal et al. |
| 2003/0151279 | A1 | 8/2003 | Fowler |
| 2004/0007910 | A1 | 1/2004 | Skelly |

FOREIGN PATENT DOCUMENTS

| | | | |
|---|---|---|---|
| DE | 3820658 | | 12/1989 |
| DE | 196 53 516 | * | 6/1997 |
| DE | 196 02 909 | * | 7/1997 |
| DE | 197 24 764 | * | 10/1998 |
| EP | 0 142 822 | | 11/1984 |
| EP | 0152867 | | 8/1985 |
| EP | 0 470 051 | | 2/1992 |
| FR | 21 65 201 | | 7/1973 |
| GB | 2 132 479 | | 7/1984 |
| GB | 2 224 178 | | 4/1990 |
| GB | 2 302 268 | | 1/1997 |
| JP | 60148727 | | 8/1985 |
| SA | 850928 | | 8/1985 |
| WO | WO 95/09742 | * | 4/1995 |

OTHER PUBLICATIONS

"Weekender: Asian Crisis Offers Opportunities for SQ," Business World Pub. Corp, Business World, p. 32, Sep. 25, 1998.

Sloan, Gene, "Culture Defines Singapore Airlines Executive Cheong Choong Kong Takes a Hard Look at the Industry," Gannett Co., Inc., USA Today, Section: Life p. 8D, Oct. 2, 1998.

Megatops Take Off in First Class Style: James O'Brien Looks at Singapore Airlines' Pounds 250 Millioin Revamp of its Passenger Services, Midland Indep. Newspaper PLC, Birmingham Post, p. 21, Oct. 7, 1998.

Singapore Airlines Announces S$500 Mil. (US $300 Mil) Product Launch, PR Newswire Assoc. Inc., PR Newswire, Section: Financial News, Sep. 16, 1998.

"India—S'pore Airlines Upgrading Facilities," FT Asia Intelligence Wire, Business Line, Section: Business Sep. 13, 1998.

Thomas, Geoffrey, "SIA Ready to Spend Despite Asian Recession," McGraw–Hill Cos., Inc., Aviation Week and Space Technology, Sect: Air Transport vol. 149, No. 13, p. 63, Sep. 28, 1998.

"Singapore to Spend $300 Million on Total Airline Upgrade," McGraw–Hill Cos., Inc., Aviation Daily, vol. 333, No. 52, p. 451, Sep. 14, 1998.

* cited by examiner

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 25–27 is confirmed.

Claims 1–3, 5, 6, 8, 9, 11, 13–15, 17, 18, 23 and 24 are determined to be patentable as amended.

Claims 4, 7, 10, 12, 16 and 19–22, dependent on an amended claim, are determined to be patentable.

New claims 28–34 are added and determined to be patentable.

1. A headrest for supporting a person's head, said headrest comprising:
   at least a first wing member adapted to abuttingly engage at least a first side portion of the head;
   a back member adapted to abuttingly engage at least a back portion of the head; and
   at least a first hinge for interconnecting said first wing member to a first portion of said back member, wherein said first wing member is pivotable relative to said back member, wherein at least said first hinge includes a first pivot adjustment member for maintaining said first wing member in at least a first of a first plurality of pivot positions relative to said back member, said first pivot adjustment member comprising a first torsion spring, *wherein said first wing member is pivotable forwardly from a flat configuration relative to said back member but is prevented from rotating forwardly relative to said back member beyond a first stop pivot position which is at an angle of 70 degrees or less from the flat configuration relative to said back member.*

2. A headrest, as claimed in claim 1, further comprising:
   an interconnecting member for releasably interconnecting said back member to a seat adapted to support the person, *wherein said headrest is a headrest for automobile applications and wherein said interconnecting member comprises a metallic material to adequately support the person's head during rear-end collisions, and further wherein said first wing member and said back member include plastic frames.*

3. A headrest, as claimed in claim 1, further comprising:
   at least a first stem interconnectable to said back member, said first stem adapted to releasably engage a seat adapted to support the person, *wherein said headrest is a headrest for automobile applications and wherein said interconnecting member comprises a metallic material, and further wherein said first wing member and said back member include plastic frames, and wherein a plastic frame for said back member includes a plurality of cut out portions.*

5. A headrest, as claimed in claim 1, further comprising:
   [a first strap for interconnecting said back member to a head support portion of a seat adapted to support the person] *a second hinge for pivotally interconnecting a second wing member to said back member; and*
   *a first interconnecting member for attaching said back member to a seat, wherein said first interconnecting member comprises a first strap and a second strap, said first strap being loopable through first and second slots of said back member, said first and second slots being located proximate said first and second hinges, wherein said second strap is loopable through a third slot located in an upper portion of said back member..*

6. A headrest, as claimed in claim 1, further comprising:
   at least a first cushion member for covering at least one of said back member and said first wing member, *wherein said first cushion member comprises first and second layers, whereby a first layer of padding has a durometer greater than the second layer of padding, the first layer of padding in abutting relation with relation to a frame of the at least one of the back member and the first wing member.*

8. A headrest as claimed in claim [1, wherein one of a front wall and a back wall of at least said first wing member is abuttingly engagable with one of the front wall and the back wall of said back member] *7 wherein said first and second wing members are generally rectangular in shape and have a height less than a back member height of said back member.*

9. A headrest, as claimed in claim 1, wherein [at least] said first wing member [is pivotable relative to said back member between first and second stop pivot positions, wherein at said first stop pivot position a first surface of said first wing member is angled 70 degrees or less relative to said back member] *is first limited in pivoting relative to the flat configuration with the back member by a first rotation limiter and secondly limited in pivoting relative to the flat configuration with the back member at said first pivot stop position of seventy degrees or less by a second rotation limiter.*

11. A portable headrest releasably interconnectable to a seat, said portable headrest comprising:
   a back member for supportably engaging at least a back portion of a person's head;
   first and second wing members for supportably engaging first and second side portions, respectively, of the person's head, wherein said first and second wing members are [one of] pivotally interconnected [and integrally formed] to first and second end portions of said back member, respectively, *and further wherein said first and second wing members are limited in forward rotation relative to the back member from rotating forwardly beyond a rotation stop angle, the rotation stop angle being an angle of seventy degrees or less*; and
   a first interconnecting member for attaching said back member to the seat, wherein said first interconnecting member comprises a first stem releasably securable to a back support member of the seat.

13. A portable headrest, as claimed in claim 12, wherein at least said first hinge member comprises a first unbalanced hinge requiring first and second torques to move said first wing member in first and second directions, respectively, relative to said back member, *wherein said first torque for moving said first wing member in said first direction is greater than said second torque for moving said first wing member in said second direction, wherein said first and second directions correspond to at least said first wing member being in unfolded and folded configurations, respectively.*

14. A portable headrest, as claimed in claim [13, wherein said first torque for moving said first wing member in said first direction is greater than said second torque for moving said first wing member in said second direction] *11 wherein said portable headrest is a headrest for automobile applications and wherein said first stem comprises a metallic material to adequately support the person's head during a rear-end collision, and further wherein said first and second wing members include plastic frames, and wherein a plastic frame for said back member includes a plurality of hollowed out portions.*

15. A portable headrest, as claimed in claim [14, wherein said first and second directions correspond to at least said first wing member being in unfolded and folded configurations, respectively] *11 wherein said first and second wing members are first limited in pivoting relative to the back member by a first rotation limiter and secondly limited in pivoting relative to the back member at said rotation stop angle of seventy degrees or less by a second rotation limiter.*

17. A portable headrest, as claimed in claim 11, wherein said first and second wing members are each [movable to at least one of first and second orientations, said first orientation corresponding to the first and second wing members being substantially coplanar with said back member, said second orientation corresponding to said first wing member being in abutting relation to said back member and said second wing member being in abutting relation to said first wing member] *additionally rotatable upwardly and downwardly.*

18. A headrest comprising:
   a frame adapted to support a back portion and at least one of first and second side portions of a person's head, said frame comprising first and second wing members and a back member having first and second laterally spaced side walls;
   first and second pivot members for pivotally interconnecting said first and second wing members to said back member, respectively, said first and second pivot members located on said first and second side walls of said back member, said first and second pivot members including first and second torsion springs, respectively, for maintaining said first and second wing members in at a first of a first plurality of pivot positions and a first of a second plurality of pivot positions, respectively, relative to said back member;
   first and second rotation stop members for limiting *forward* rotation of said first and second wing members, respectively, relative to said back member, wherein said first and second wing members are each at least horizontally rotatable relative to said back member from a first position substantially coplanar with said back member to a second position, said second position being less or equal to [about] 80 degrees *of forward rotation* from said first position, *wherein said first and second rotation stop members prevent said first and second wing members from rotating forwardly beyond the second position*; and
   padding covering said frame, said padding at least interposable between said frame and the back portion and first and second side portions of the person's head.

23. A headrest for supporting a person's head, said headrest comprising:
   at least a first wing member adapted to abuttingly engage at least a first side portion of the head, *wherein said first wing member is generally rectangular in shape and has a first wing member height which is less than a back member height*;
   a back member adapted to abuttingly engage at least a back portion of the head, *the back member having the back member height, wherein the back member comprises a plastic frame portion having a plurality of cut out portions*;
   at least a first hinge for interconnecting said first wing member to a first end portion of said back member, wherein said first wing member is pivotable relative to said back *member and is connected to said back member such that a bottom portion of the first wing member is aligned with a back member bottom portion and a top portion of the first wing member is below a back member top portion, wherein the first wing member is prevented from pivoting forwardly beyond a rotation stop, wherein the rotation stop is at an angle of seventy degrees or less from a flat configuration relative to said back member*; and
   an interconnecting member for releasably interconnecting said back member to a seat adapted to support the person, wherein said interconnecting member includes at least a first stem interconnectable to said back member, said first stem adapted to releasably engage the seat.

24. A headrest for supporting a person's head, said headrest comprising:
   at least a first wing member adapted to abuttingly engage at least a first side portion of the head;
   a back member adapted to abuttingly engage at least a back portion of the head; and
   at least a first hinge for interconnecting said first wing member to a first and portion of said back member, wherein said first wing member is pivotable relative to said back member, said first hinge comprising a first unbalanced hinge, wherein a first torque for moving said first hinge in a first direction is greater than a second torque for moving said first hinge in a second direction, *wherein said first wing member is prevented by a rotation to stop from pivoting forwardly beyond a rotation stop angle which is an angle of seventy degrees or less relative to said back member.*

28. *A headrest for supporting a person's head, said headrest comprising:*
   *at least a first wing member adapted to abuttingly engage at least a first side portion of the head;*
   *a back member adapted to abuttingly engage at least a back portion of the head; and*
   *at least a first hinge for interconnecting said first wing member to a first portion of said back member, wherein said first wing member is pivotable relative to said back member, wherein at least said first hinge includes a first pivot adjustment member for maintaining said first wing member in at least a first of a first plurality of pivot positions relative to said back member, said first pivot adjustment member comprising a first torsion spring, wherein at least said first wing member is pivotable relative to said back member between first and second stop pivot positions, wherein at said first stop pivot position a first surface of said first wing member is angled forwardly 70 degrees or less from a flat configuration relative to said back member, wherein said first wing member is limited from pivoting forwardly beyond said first stop pivot position.*

29. *A portable headrest releasably interconnectable to a automobile seat, said portable headrest comprising:*
   *a winged headrest back member for supportably engaging at least a back portion of a person's head, said winged* headrest back member having a winged headrest back member height, said winged headrest back member comprising a plastic winged headrest back member frame, said plastic winged headrest back member frame having a plurality of back member frame cut out areas;

a first wing member for supportably engaging a first side portion of the person's head, wherein said first wing member is pivotally interconnected to a first end portion of said winged headrest back member, said first wing member being generally rectangular in shape and having a first wing member height less than said winged headrest back member height, said first wing member being connected to said back member such that a first wing member bottom portion is substantially aligned with a back member bottom portion and a first wing member top portion is below a back member top portion, said first wing member having a first wing member plastic frame, said first wing member being limited in forward rotation from rotating forwardly beyond a rotation stop angle, wherein the rotation stop angle is an angle of 70 degrees or less forward from a flat configuration relative to said winged headrest back member;

a second wing member for supportably engaging a second side portion of the person's head, wherein said second wing member is pivotally interconnected to a second end portion of said winged headrest back member, said second wing member being generally rectangular in shape and having a second wing member height less than said winged headrest back member height, said second wing member being connected to said back member such that a second wing member bottom portion is substantially aligned with said back member bottom portion and a second wing member top portion is below said back member top portion, said second wing member having a second wing member plastic frame, said second wing member being limited in forward rotation from rotating forwardly beyond the rotation stop angle, wherein the rotation stop angle is the angle of 70 degrees or less forward from the flat configuration relative to said winged headrest back member;

a first interconnecting member for attaching said winged headrest back member to the automobile seat, wherein said first interconnecting member comprises a first stem comprising a metallic material and is releasably securable to a back support member of the automobile seat.

30. The headrest of claim 29 further comprising first and second rotation limiters with respective limits of forty five and seventy degrees.

31. The headrest of claim 29 wherein a first rotation stop limiter limits forward rotation of a first angle less than the rotation stop angle and a second rotation limiter limits forward rotation at the rotation stop angle.

32. The headrest of claim 29 wherein said first and second wing portions are rotatable upwardly and downwardly.

33. The headrest of claim 31 wherein said first rotation stop limiter comprises a foam wedge.

34. The headrest of claim 29 wherein said headrest further comprises a at least a first cushion member for covering said winged headrest back member, wherein said first cushion member comprises first and second layers, whereby a first layer of padding has a durometer greater than the second layer of padding, the first layer of padding in abutting relation with relation to a frame of the winged headrest back member.

* * * * *